US006479740B1

(12) United States Patent
Schwartz et al.

(10) Patent No.: US 6,479,740 B1
(45) Date of Patent: Nov. 12, 2002

(54) DIGITAL REVERSE TAPE EFFECT APPARATUS

(76) Inventors: Louis Schwartz, 24 Hillside Ave., Ansonia, CT (US) 06041; G. Burnell Hohl, 21 Driftway La., New Canaan, CT (US) 06840

( * ) Notice: Subject to any disclaimer, the term of this patent is extended or adjusted under 35 U.S.C. 154(b) by 0 days.

(21) Appl. No.: 09/775,931

(22) Filed: Feb. 3, 2001

Related U.S. Application Data

(60) Provisional application No. 60/180,429, filed on Feb. 4, 2000.

(51) Int. Cl.[7] .......................... A63H 5/00; B04B 13/00; G01H 7/00; G01H 1/36

(52) U.S. Cl. ........................................... 84/609; 84/605

(58) Field of Search .......................... 84/605, 609, 612, 84/634, 636, 692

(56) References Cited

U.S. PATENT DOCUMENTS 4,915,001 A * 4/1990 Dillard
4,947,723 A * 8/1990 Kawashima et al.
5,090,291 A 2/1992 Schwartz
5,239,123 A * 8/1993 Fujita et al.
5,245,663 A 9/1993 Green
5,281,755 A * 1/1994 Matsui et al.
5,350,882 A * 9/1994 Koguchi et al.
5,509,079 A 4/1996 Green
5,512,704 A * 4/1996 Adachi
6,355,870 B1 * 3/2002 Tsai et al. ..................... 84/605

* cited by examiner

*Primary Examiner*—Jeffrey Donels
(74) *Attorney, Agent, or Firm*—Melvin I. Stoltz

(57) ABSTRACT

A method for the simulation of a realistic reverse tape effect, in real time, comprising the steps of detecting the beginning of a note by monitoring the input audio signal to determine when the same exceeds a variable amplitude threshold for a predetermined period of time and initially modulating audio signal gain with a rising exponential, while simultaneously recording the note attack and initial portion of the note decay period in digital memory, and when the input note amplitude envelope has decayed to a predetermined percentage of its peak value, stopping recording and beginning playback of the previously stored portion of the note decay and attack dynamic, in reverse, with a fixed signal gain.

14 Claims, 7 Drawing Sheets

DIGITAL REVERSE TAPE EFFECT APPARATUS

CROSS-REFERENCE TO RELATED APPLICATION

The present application is a utility patent application based upon earlier filed U.S. Provisional Application Ser. No. 60/180,429, filed Feb. 4 2000, the disclosure of which earlier filed application is hereby incorporated by reference and the priority of which earlier filed United States Provisional Application is hereby claimed.

TECHNICAL FIELD

The invention relates to a special effects device for a musical instrument, such as an electric guitar, having an electrical output.

BACKGROUND OF THE INVENTION

1. Field of the Invention

The present invention relates generally to apparatus for producing unusual audio effects. In particular, the invention relates to a device that produces a complete and actual signal reversal after an initial time delay that is equal to the duration of the first initial inputted signal. In a second mode, the device will produce an accurate simulated signal reversal, with no apparent time delay, by storing the attack dynamic and an initial portion of the signal decay, while modulating the signal gain to simulate the amplitude envelope of a reversed signal. The stored portion of the signal is then "spliced" onto the simulated reversed signal part way through its duration, ideally by matching the envelope height and the beginning of the repetitive waveform that comprises the note being reversed.

2. Background

A musical note, or tone, produced by a musical instrument of string, piano or percussion type, and, in particular, electric and electronic guitars, is characterized by a repetitive waveform of relatively high frequency within an envelope of much lower frequency having a relatively rapid rise (corresponding to the plucking of the guitar string) and a relatively slow decay as the string releases its energy in the form of a musical note. This relatively slow decay is usually exponential in nature.

If a single note is recorded and then played backward, the played back backward (or "reversed") note will be characterized by a reversed repetitive waveform of relatively high frequency and an envelope having a relatively slow exponential rise and a relatively fast decay. Producing a series of notes where the notes are played back in the same sequence but each single note is played "backward", as if time reversed, and has a slow exponential rise and fast decay produces an unusual and pleasing effect that is useful in the recording of modern music. It is especially effective for electric and electronic instruments such as the electric guitar.

The typical method of generating a note backwards has been to record the note on magnetic or a vinyl medium as it would normally be heard and to then reverse the direction of play of the medium. The drawbacks of this awkward, cumbersome method are that it requires a medium having prerecorded tones or notes disposed on it and cannot be used in live performance; also the medium is often damaged when the direction of play is reversed.

Prior art technology produced such an effect. The prior art technology also accomplished the entering of a musical note into a device such as a random access memory chip and playing the note backwards and simultaneously entering the next note into memory. This was done by filling and emptying the memory.

Prior art note reversal devices also utilized predetermined or fixed address limits or packet lengths. The playback of the decay of a note as the attack of the reversed note was of a fixed length regardless of the length of the original decay.

Input signals were often broken up into segments if the reversed note exceeded the length of the packet. As can be understood from the above, the prior art technologies necessarily result in at least a one note delay and involve truncations of the reversed note playback in the event of notes of varying length, due to the use of fixed packet lengths.

SUMMARY OF THE INVENTION

It is an object of the present invention to provide a simple method of generating musical tones or notes in reverse without utilizing magnetic recording technologies. It is also an object of the present invention to provide a music signal converter device for producing an output signal, which for each note signal, is either a substantially faithful time reversed version of the input note signal, particularly with regard to envelope shape and duration and saved attack component, or a complete and actual reversal of the input note. It is another object of the present invention to address signal delays and accommodate notes of varying length.

It is a further object of the present invention to provide a realistic and highly accurate truer real time reverse tape simulation by utilizing a generated envelope based upon the inverse normalized slope of the decay envelope of the sampled inputted note and mating it with the actual attack dynamic which is saved in memory, reversed and spliced onto the "simulated" envelope.

It is a further object of the present invention to eliminate the dependency of the attack of the reversed note on a fixed length of time. The present invention utilizes address limits based on the note envelope passing through amplitude thresholds so that both the beginning and the end of the note produced are determined from the characteristics of the input note. For a given note, the duration of the output of the inventive system corresponding to the playback of the note in reverse, corresponds to the amount of space in memory required to store the note. Hence, the time period of the output note is variable and dependent upon the duration of the input note.

These objects of the invention in the embodiment of a true note reversal system are achieved in accordance with the preferred embodiments by a method for reversing a series of notes, in which each of the notes have a waveform, comprising the steps of digitizing sequential, storing the digitized notes in memory, and playing back the digitized notes, the playing back being done with the waveform of each note reversed but with the notes in the original sequence of the series, playback of a reversed note beginning after the end of the note is detected and the entire note has been stored in memory. The notes are not broken up, recorded and played back in fixed length packets, nor is the filing/emptying of memory based upon specific time periods or determined by predetermined fixed memory address limits, and the duration of the recording and playback notes to and from memory is made variable and a function of the actual length of the notes. The amount of memory occupied by an individual note varies with the length of the note, and silence intervals between successive notes are encoded during recording and reproduced during playback, the silence intervals not being stored in memory. The beginning of a note is detected by the input audio signal exceeding a variable amplitude threshold for a predetermined period of time. A end of a note is determined by the input audio signal not exceeding a variable amplitude threshold for a predetermined time interval, the variable threshold being derived proportional to the peak attack amplitude of the note, whereby softer notes are prevented from being terminated prematurely as compared to the operation of a fixed end note threshold. Addressing of memory used to store digitized notes is controlled by a microcontroller with memory organized in segments, the microcontroller being linked in software, to maximize the efficient utilization of memory. Then start of a note is detected without clipping, audio is continuously recorded in one memory segment; when the end of this segment is reached, recording wraps back to the beginning so as to continuously loop through the segment; when the beginning of a note is detected, the start address of the note is stored and recording then advances to reverse playback of the note, when the last memory segment is reached, playback begins at the start address and decrements through the segment, for a fixed time interval, to assure that the entire note attack is played in reverse, including the portion which may have occurred prior to detection of the beginning of the note.

The inventive method for the simulation of a realistic reverse tape effect, in real time, comprising the steps of detecting the beginning of a note by monitoring the input audio signal to determine when the same exceeds a variable amplitude threshold for a predetermined period of time and initially modulating audio signal gain with a rising exponential, while simultaneously recording the note attack and initial portion of the note decay period in digital memory, and when the input note amplitude envelope has decayed to a predetermined percentage of its peak value, stopping recording and beginning playback of the previously stored portion of the note decay and attack dynamic. The inflection point amplitude envelope, i.e. the boundary between the note attack and decay portions of the note envelope is detected to determine the peak amplitude of the note waveform, the detection being done by software calculation and monitoring for decreasing successive peak signal amplitudes at between 6 and 26 millisecond intervals. The inflection point amplitude is used to digitally normalize the amplitude envelope of a note by dividing down the peak amplitude, by powers of two, and combining the quotients to create fractional amplitude thresholds; the decay portion of the input amplitude envelope is compared against the thresholds to give a measure of the rate fo decay or slope of the exponential note envelope. As a note decays through each calculated amplitude threshold, microcontroller software modulates the gain of a multiplying digital to analog converter from an initial value of substantially zero to a maximum predetermined gain, to create a rising exponential gain transfer function. A rising exponential gain transfer function is created by varying the reference voltage of the multiplying digital to analog converter through a pulse-width gain modulator. When a note envelope decays to between ten and thirty percent of its peak amplitude, the decaying exponential and its inverse (mirror image) intersect, the D/A converter gain is increased to its maximum value of gain, and the previously recorded portion of the note decay and attack dynamic are “spliced” into the simulated reverse note effect by playing them back in reverse from memory. During reverse playback from memory, the microcontroller monitors the analog to digital converter signal data to detect premature termination of a note decay, such as that caused by a musician muting the guitar string, or the start of a new note to terminate playback, the playback being otherwise terminated when the note start address is reached and a pre-start audio interval is played and recording is then advanced to reverse playback of the note, when the last memory segment is reached, playback begins at the start address.

BRIEF DESCRIPTION OF THE DRAWINGS

The invention will be understood with reference to the drawings, in which.

DETAILED DESCRIPTION OF THE PREFERRED EMBODIMENTS

The inventive device performs a complete backmasking effect in almost real time after a delay determined by the duration of characteristics of a first input signal in the form of a musical note. A musical note has a characteristic waveform associated with it. Each note inputted into the device is substantially stored and read out in reverse order so that a final cycle of the characteristic waveform read in becomes a first cycle of a characteristic waveform read out resulting in a so called “last in/first out” (LIFO) output. The resulting output is the playback of each note input but with each note being actually reversed. However, the sequence of notes input remains unchanged, because of the speed with which output notes are constructed with reverse time characteristics and output by the system.

Figure 1:
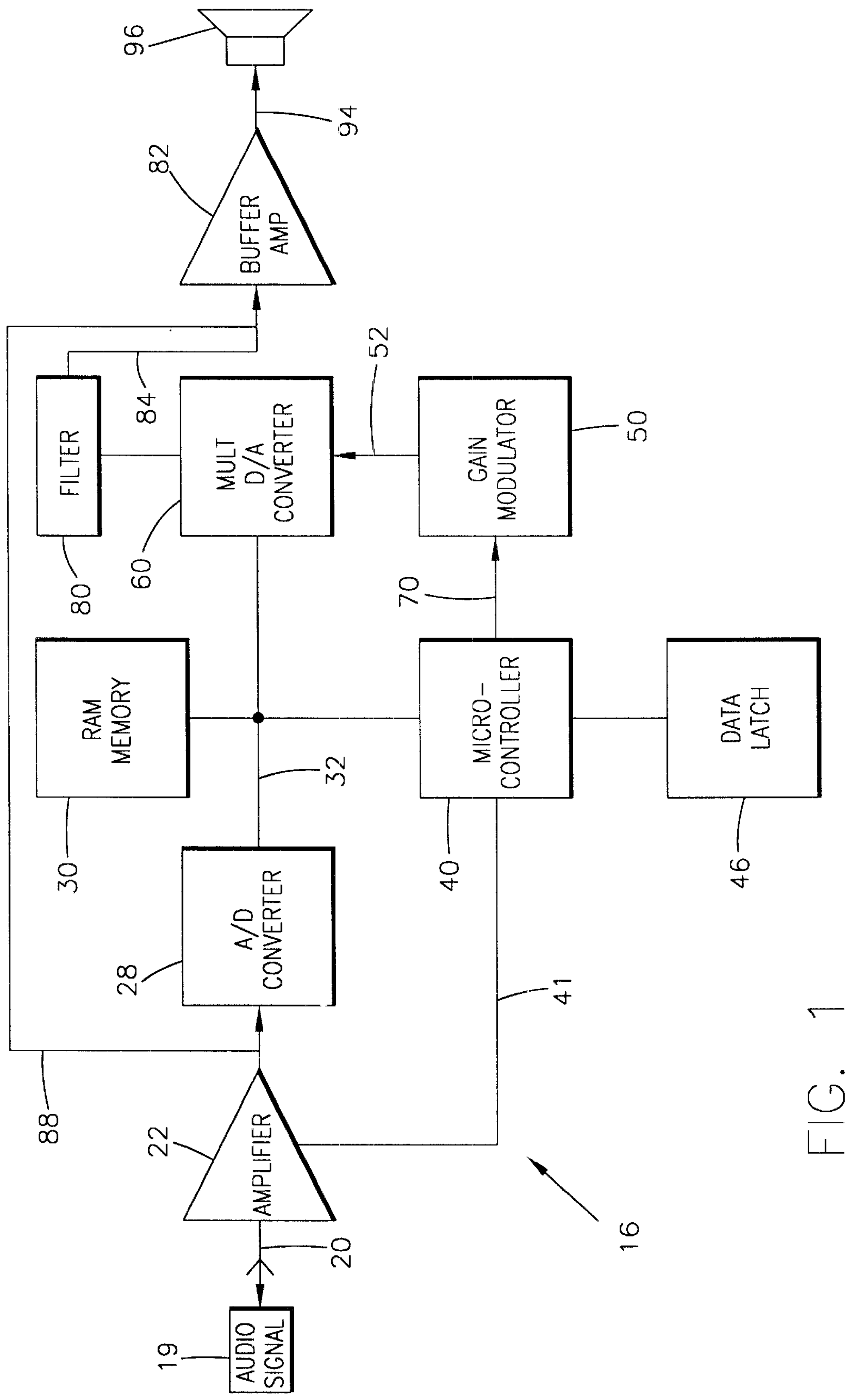
FIG. 1 is a block diagram of a reverse tape effect apparatus of the present invention.

Referring now to FIG. 1, a schematic block diagram of a digital reverse tape effect circuit 16 is shown. An analog audio input signal composed a sequence of note signals output from a music signal source 19, such as an electric guitar, is received by input port 20. Output port 94 supplies an apparently time reversed output note signal corresponding to each input note signal to an audio device, e.g. an amplified speaker system 96.

Input port 20 feeds to a pre-amplifier 22 whose output, in turn, drives an analog to digital converter 28. Analog to digital converter 28 converts the analog audio input signal into a digital signal. The conversion time is the time required to complete the transformation of an analog signal into a digital signal. The digital reverse tape effect circuit uses a twelve-bit linear analog-to-digital converter. In the preferred embodiment, conversions are triggered by microcontroller 40. Microcontroller 40 causes conversion at the rate of about 31 KHz. Microcontroller 40 is clocked using a 16 MHz microcontroller crystal.

The sampling rate (which corresponds to one sample every thirty-two microseconds) is under the control of software so that the sampling rate can be easily modified. This allows the circuit to be modified to accommodate a range of applications, for example, different instruments with different pitch outputs. Multiplying digital to analog converter 60 converts twelve-bit digitized note samples, depending on the mode of application from SRAM 30, converter 28, or the microcontroller 40, into an analog audio signal. A multiplying digital to analog converter, such as multiplying digital to analog converter, multiplies its output by a scaling factor, thus controlling the output signal amplitude, as is described below.

More particular in the full reversal mode of operation, these digitized note samples come from SRAM 30 as stored notes and are played back in reverse by microcontroller 40. This results in a delay in playback equal to the length of the note, and can be disconcerting to the musician.

In a simulated mode of operation, note samples are 1) stored in SRAM 30 for later playback in reverse in the first part of the output operation and 2) are fed directly from analog digital converter 28 as output 32 to the multiplying digital analog converter 60. Converter 60 gain modulates output signal 32 to simulate the note reversal that is reduces signal 32 to a very low value resulting in a very low output for converter 60 and gradually increases the output of converter 60, until when the input note has decayed to a fixed (or alternatively predicted) threshold level, as determined by the microcontroller 40 software, the initial stored note attack rise and subsequent stored portion of the note decay are played back in reverse from SRAM 30. Operation of multiplying digital to analog converter 60 is controlled by microcontroller 40. Multiplying digital to analog converter 60 is loaded with data samples to convert at a 31 KHz rate using a 16 MHz microcontroller crystal. The gain of the multiplying digital to analog converter is controlled by a reference voltage input which is modulated by microcontroller 40 in the simulated mode of operation.

The signal output 32 of analog digital converter 28 is coupled to a multiplying digital to analog converter 60, microcontroller 40, and the data in/out lines of a static random access memory (SRAM) chip 30. The digital signals in the preferred embodiment are notes from an electric guitar; at the end of each note, the note attack or beginning is played back in reverse by the system.

Microcontroller 40, creates a chop signal used to create a negative voltage supply for the input amplifier 22. Microcontroller 40 is attached to data latch 46 which provides control of the memory address. The inventive digital reverse tape effect may use a Microchip Technology PIC16C64 chip as the microcontroller or the like. Microcontroller 40 contains two thousand words of internal ROM and one-hundred twenty eight bytes of RAM and has thirty-three input/output pins which are capable of being configured as either inputs or outputs.

Figure 2:
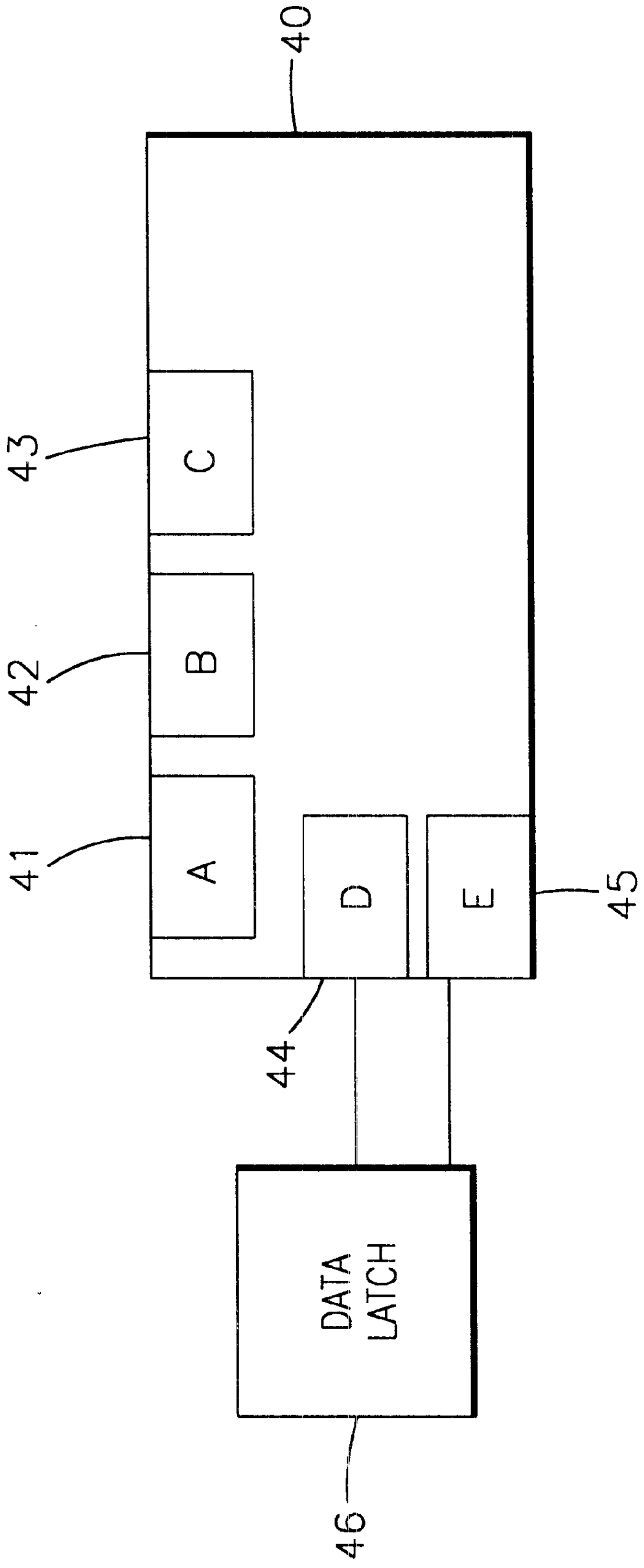
FIG. 2 is a block diagram of a microcontroller and a data latch showing data ports and attachments to the data latch.

FIG. 2 illustrates microcontroller 40, which can be any suitable high-speed microcontroller. In FIG. 2, port 41 (port A), is used to control the timing of the analog to digital converter and switching of power to the digital reverse tape effect circuit. Port 42 (port B), is used to read and write musical note data to or from SRAM 30, analog digital converter 28, or multiplying digital to analog converter 60. Data latch 46 is situated between port 44 (port D) and port 45 (port E), and the upper portion of the SRAM 30 address bus. The digital reverse tape effect circuit prototype utilizes a 74HC374 data latch to latch the upper portion of the RAM address. Furthermore, port 43 (port C), works to control the timing of SRAM 30, the multiplying digital to analog converter 60, and the output pulse width modulated signal 70 to gain modulator 50.

Simulated Reverse Mode

Referring again to FIG. 1, in the simulated mode of operation, gain modulator 50 uses a pulse width modulated signal 70 to modulate the voltage reference output from multiplying digital to analog converter 60 and converts the modulated reference voltage into a DC level signal 52. The DC level signal 52 is then fed back as the voltage reference input to the multiplying digital to analog converter 60 in order to vary the gain of the digital to analog converter 60.

The output from the multiplying digital to analog converter 60 passes through a single-pole low-pass filter 80 and then throughly switch 84 to become the non-inverting input of a unity-gain low-noise buffer amplifier 82. A switch 84 at the input of amplifier 82 selects audio from the digital reverse tape effect circuit as illustrated in solid lines, or directly from the input amplifier 22 as illustrated in dash lines to bypass the reverse tape effect.

Full Reversal Mode

In full reversal mode of operation, gain modulator 50 is disabled. The entire note is stored. After storage played back. Digital signals originate from SRAM 30 and are played back in reverse by the microcontroller 40. The multiplying digital to analog converter 60 is operated at maximum gain. Analog output from the multiplying digital to analog converter 60 passes to a buffer amplifier 82 for complying to an external amplified speaker system 96.

In the third mode, the digital reverse tape effect circuit may be bypassed through the use of switch 84.

Static random-access memory (SRAM) 30 is used to store the signals from the analog-to-digital converter 28. The digital reverse tape effect prototype contains 128,000 sixteen-bit wide words of SRAM, and will accommodate the use of a sixteen-bit analog to digital converter if greater sample encoding resolution is desired.

An alternate embodiment of the digital reverse tape effect circuit utilizes DRAM (dynamic random access memory) and the software is modified to handle the more complex timing of DRAM. This software modification will furthermore allow the digital reverse tape effect circuit to refresh memory addresses when data samples are not being recorded.

In the full reversal mode of operation, software manages the SRAM in thirty-two 4,096 word segments. At a sampling rate of approximately 31 KHz, each memory segment holds about one-eighth of a second of sound. The reading and writing of sound data to and from the memory, as well as the memory addressing, are controlled by microcontroller 40, which executes the software algorithm that controls the circuit.

In the full reversal mode of operation the audio input is continuously recorded in an available SRAM 30 memory segment, storing 12-bit digitized audio samples at sequentially incrementing memory addresses within the given segment. When the end of the segment is reached, recording wraps back to the start address of the segment. The peak input audio amplitude is calculated by the software every 16 msec. When this peak amplitude exceeds a fixed amplitude threshold for 32 msec the beginning of a note is detected. The current RAM address is stored as the note start address and recording advances to a new memory segment. Memory segments are allocated as they are available and are not necessarily used in sequential order. Segments are allocated using a software linked list, which allows for most efficient utilization of unused blocks of memory, but implies that a single sound note may actually be stored in different segments spread throughout the memory.

Recording continues at sequential incrementing addresses within the memory segments until the end of the note is detected. This occurs when the measured peak amplitude falls below a variable threshold for 32 msec. The end note threshold is adjusted by the software, proportional to the peak attack amplitude of the note. Upon detecting the end of the note, software stores the end note address and segment information which becomes the playback start address. The time from the end of note until the start of the next note (silence interval) is measured, encoded and stored so that it can be faithfully reproduced during playback. Silence intervals between notes therefore do not use up memory storage capacity.

In full reversal mode, once a note has been fully recorded in memory, playback of the note begins while the system continues recording of successive notes. The silence interval starting at the end of the previous note is first reproduced and playback then begins at the recorded end note address. A note is played back by retrieving note data from the memory in the reverse order that it was recorded. The microcontroller controls multiplexing of the memory between the writing of note data being recorded and the reading of previously recorded note data being played back. In playback, memory segments are retrieved from their linked list in the reverse order that they were recorded and memory addresses are sequentially decremented within each memory segment. When the last playback segment is reached, playback begins at the note start address and decrements through the segment, for a short interval, to play back the portion of the note attack that occurred prior to detecting the start of the note. Playback of note data is always terminated at a DC zero crossing to prevent audible DC level shift at the digital to analog converter 60.

Simulated Reversal Mode

In the simulated mode of operation, digitalized note samples are continuously recorded sequentially in a single RAM memory buffer, and simultaneously latched into multiplying Digital-to-Analog (D/A) converter 60. The peak signal amplitude is calculated every 16 msec by microcontroller 40 and when it exceeds a fixed amplitude threshold for 32 msec, the beginning of a new note is detected and its start address is stored. Microcontroller 40 monitors successive peak signals amplitudes to detect the inflection point of the note amplitude envelope. This signifies the end of the note attack time or rise and beginning of the decay period. The inflection amplitude is stored and used to normalize the note amplitude envelope, by dividing the inflection amplitude by powers of two and combining the results, in software, to create a series of amplitude thresholds that to represent various fractions of the peak inflection amplitude. As the inputted note envelope decays and passes through these amplitude thresholds, the gain of multiplying D/A converter 60 is modulated by microcontroller 40 from a minimum value near zero to a maximum value of unity gain. This is accomplished by changing the duty cycle of a pulse-width modulated signal that varies the reference voltage to D/A converter 60, through gai modular 50. As the note amplitude envelope decays the gain of D/A converter 60 increases exponentially rising note amplitude envelope that approximates the inverse of the note decay envelope. When the amplitude envelope reaches the level where the decaying exponential and its mirror image intersect (around 20% of the inflection amplitude) multiplying D/A converter 60 will be set to maximum (unity) gain. At this point, microcontroller 40 sets the starting RAM play address equal to the current record address and begins to play back, in reverse, the portion of the note that has been stored in memory, including an initial portion of the note decay as well as the note attack dynamic.

During the period of reverse playback from the RAM buffer, microcontroller 40 continues to monitor input signal data from A/D converter 28. Playback terminates either when the note start address (minus a fixed offset) is reached, or when input peak amplitudes fall below a threshold, indicating premature termination of a note by muting of the guitar string. In either case, termination of reverse playback samples occurs at a zero crossing, and causes D/A converters 60 to be set to a minimum gain, to be ready for the start of the next simulated note.

Figure 3A:
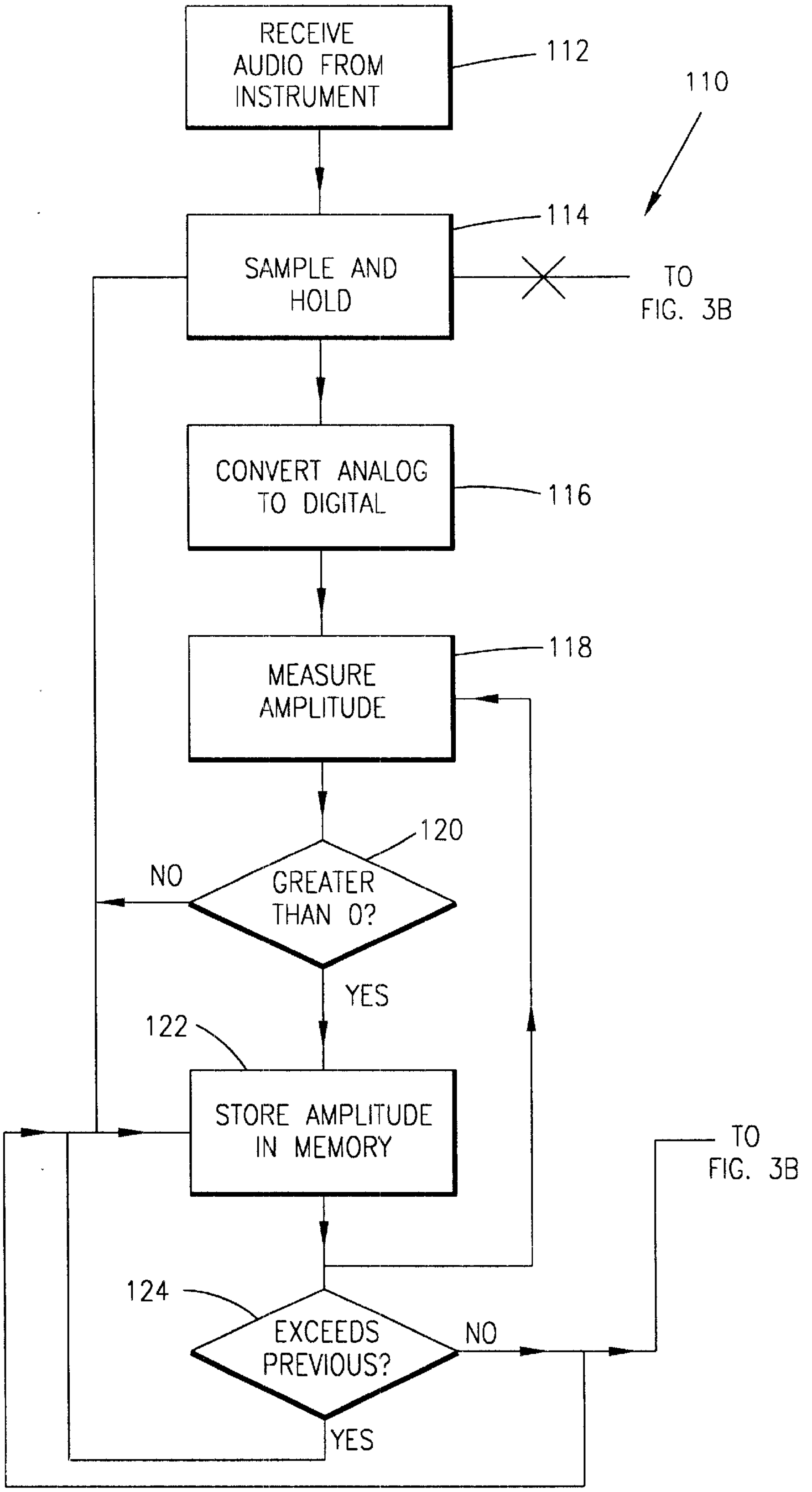
FIG. 3 is a flowchart of the microcontroller software which illustrates the functionality of the inventive simulated digital reverse tape effect system.
Figure 3B:
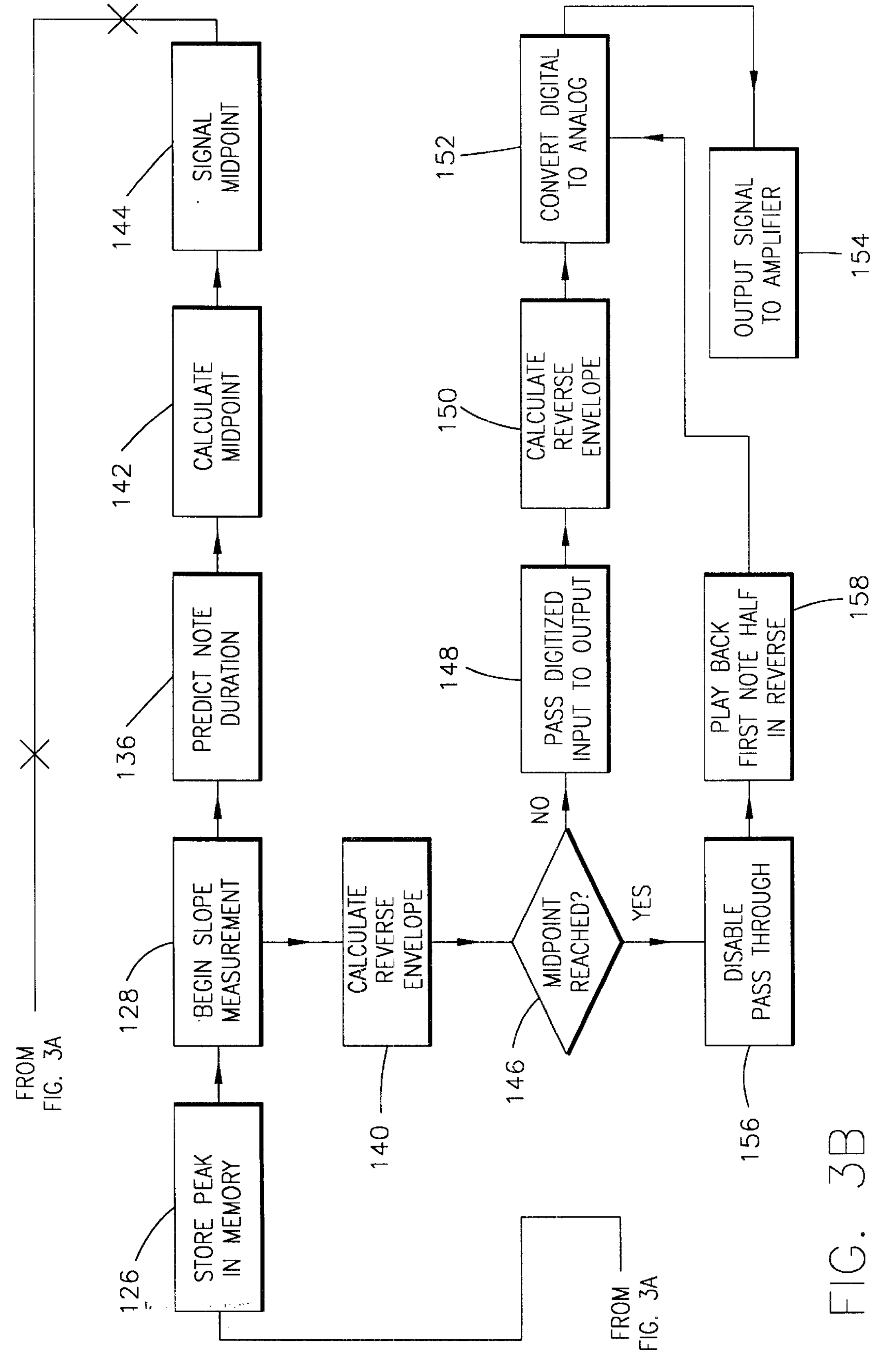

Alternative Embodiment for Simulation Mode:

Referring to FIG. 3, the operation of the inventive method for generation of a simulated reverse musical note may be understood. In particular, in accordance with the inventive method 110, as illustrated in FIG. 3, the process starts with the receiving of audio input and the form of electrical signal from an electrical or electronic instrument at step 112. After the electrical signal has been received, it is sampled and the value held in accordance with standard digital encoding techniques at step 114. At step 116, electrical signal value held at step 114 is converted from analog form to digital form.

At step 118, the amplitude of the converted signal is measured, and if it exceeds a certain threshold value, it is determined to be greater than zero. At step 120, if the signal is found to be greater than zero, this would indicate the beginning of a note if prior measurements were not greater than zero. If prior measurements were greater than zero, it would simply indicate that a note is still in progress.

Consider the situation where prior measurements were not greater than zero and the amplitude measured at step 118 is not greater than zero. In this case, the system would proceed at step 120 back to step 118, and the system would continue to monitor amplitude until the beginning of a note is detected proceeding in a loop consisting of checking out each converted analog sample at step 118, until the beginning of a note is detected.

Once the system determines that the sample is of a value greater than zero, at decision step 120, the method proceeds to step 122 where the amplitude of the sample is stored in memory, and the system proceeds back to step 114. As long as the system continues to detect an amplitude greater than zero, the system repeats steps 114 through 122 until the complete waveform of a note including its beginning or attack on through its decade down to a very low value is stored in memory. In connection with the above, it is noted that every waveform has multiple points at which it is equal to zero, and that these multiple points occur many times in the course of a sound emitted by an electric guitar string, for example, or any musical note. Accordingly, the detection of a single zero is not conclusive of the fact that the amplitude of the signal is not greater than zero. Rather, several zeroes must be received in sequence before the decision can be made that the signal is not greater than zero.

As alluded to above, after the amplitude of the signal is stored at step 122, the system proceeds back to step 114 until the entire note has been stored. It is noted that in this application the term "note" refers to the sound played by a, for example, guitar string starting when it is plucked, and continuing until the sound naturally decays to substantially zero or is made to decay to substantially zero by the finger of the guitar player pressing against the string to stop it from vibrating.

However, in addition to the digitizing and storage process by which the note is stored, simultaneously as soon as the beginning of a note is detected, in accordance with the preferred embodiment, the rise of the signal is detected and the waveform of the signal during that rise is stored and its end point determined. In accordance with the method illustrated in FIG. 3, this may be determined by implementing step 124 where it is determined whether or not the detected value of the digitized signal sample exceeds the previous digitized value. If the previous value has been exceeded, the system simply goes on to store sequential values in memory. However, when it is determined that the en signal is just beginning to fall, at step 124, the system proceeds to store the previous value as the peak value in memory.

Even though the system has determined that the attack or rise of the signal is over, a continues to store sequential samples in memory at step 122. However, once it is determined that the rise of the signal is over, it proceeds, simultaneously, at step 126, to select out sequential peak values of the signal in the repetitive waveform imported to begin to piece together the envelope and determine its slope or more precisely exponential decay characteristic at step 128.

Figure 4:
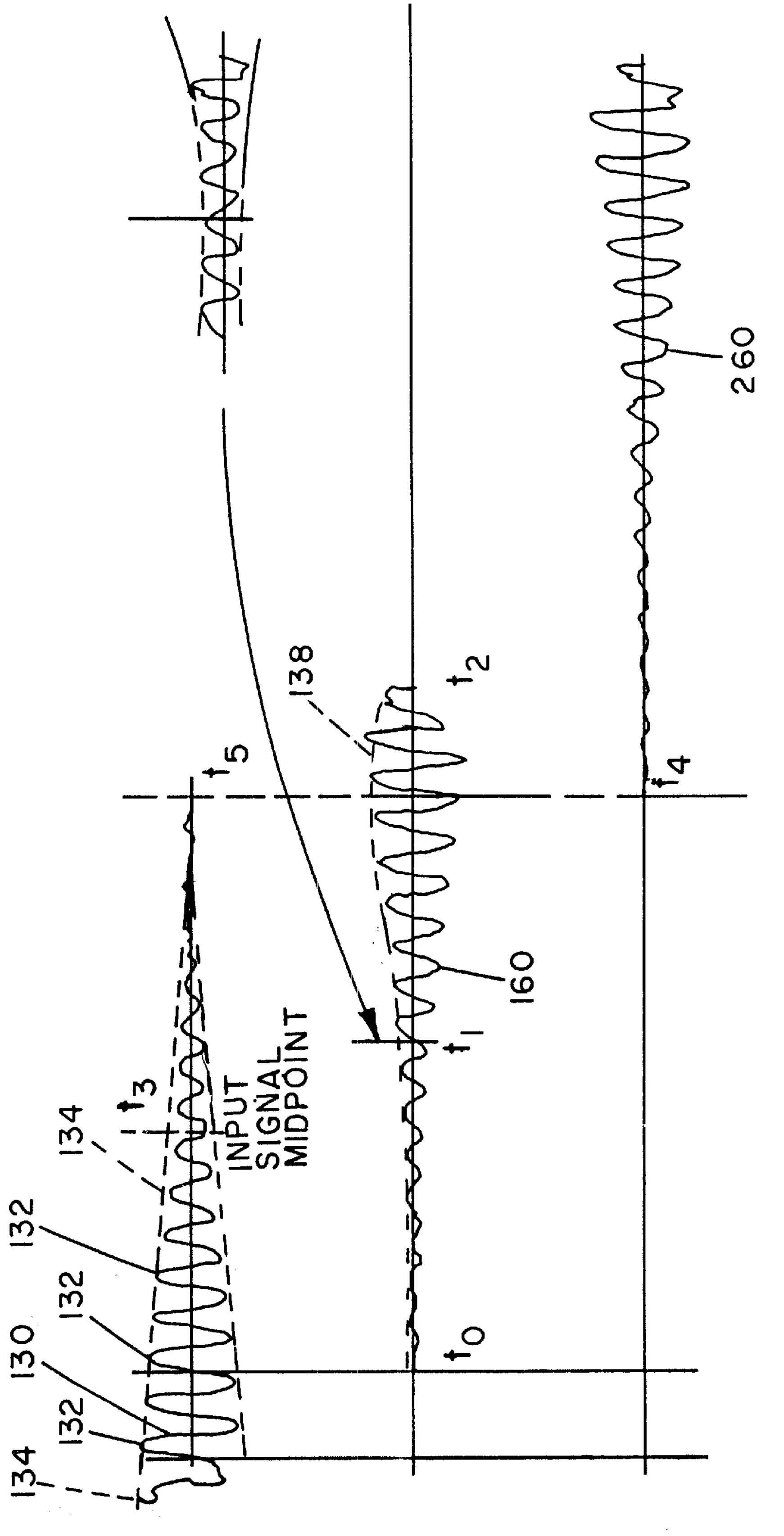
FIG. 4 illustrates input and output waveforms for two modes of the operation of the inventive system.

This may be better understood from FIG. 4 where the output 130 of an electric guitar string is illustrated. After a few signal peaks 132 have been measured, it is possible to determine the decay rate of the envelope 134.

At step 136, note duration is predicted, and the system proceeds to determine the shape of the envelope 134, and calculates the shape of a reverse envelope. Such determination of the shape of the envelope 134 and the calculation of the shape of a reverse envelope, such as envelope 138 in FIG. 4, may be done at step 140 based on either predetermine templates stored in RAM in the microprocessor, or can be done by curve fitting to the generalized exponential decay equation in accordance with standard data curve fitting techniques. Such calculation takes a period of time in order to accommodate the collection of data points, and the additional time needed to do the actual calculation. This time is equal to t0 in the example illustrated FIG. 4.

The system also uses this information at step 142 to calculate the midpoint of the musical note represented by waveform 130 in FIG. 4. At step 144, the occurrence of the midpoint, which occurs at time t1, is detected by the system which changes the operation of the system as will be described below. In particular, if the midpoint is not reached, at step 146 the system proceeds to step 148. Step 146 is performed for each sampled value of the input waveform until time t1 is reached. At step 148 the system passes to digital signal created step 116 to the digital to analog converter. At this point in the process, the system also calculates the reverse envelope at step 150 and determines what amplitude of the reverse envelope is at the particular point in the output note cycle. After this amplitude is determined at step 150, the system determines what the scaling factor should be to reduce the relatively high amplitude input signal to the relatively low amplitude just after time t0, and this value is sent to the digital to analog converter allowing conversion to an analog signal to be done at step 152 in such a manner that the output analog signal has an amplitude which corresponds to the initial portion of envelope 138 over time. By the initial portion of envelope 138 is meant the time between t0 and t1 in FIG. 4. Thus, during the initial portion of envelope 138, the actual repetitive waveform output from the instrument at step 112 is scaled and passed to an audio amplifier ultimately at step 154.

At time t1, at step 146, the system determines that the midpoint has been reached. Accordingly, the system stops passing through the input signal at step 156. The system then proceeds to step 158, where all the digitized values of the signal occurring between time 0, when the note began, until time t3, when the input signal reached its midpoint, are output from RAM memory in reverse order, resulting in the reverse waveform illustrated between time t110 time t2 in the output signal 160 as illustrated FIG. 4.

As can be seen most easily with reference to FIG. 4, the actual output waveform 130 from the electric instrument is initially monitored and after a period of time, at time t0 in his scaled down, initially, and passed to the output of the system as signal 160. It is allowed to be scaled up by the multiplying digital to analog converter resulting in a slow rise until time t1. It is noted that before time t1 individual cycles of the input signal on a reverse, but they are merely scaled. After time t1, as can be seen in FIG. 4, the actual cycles are reversed and show a reverse shape in FIG. 4.

Figure 5:
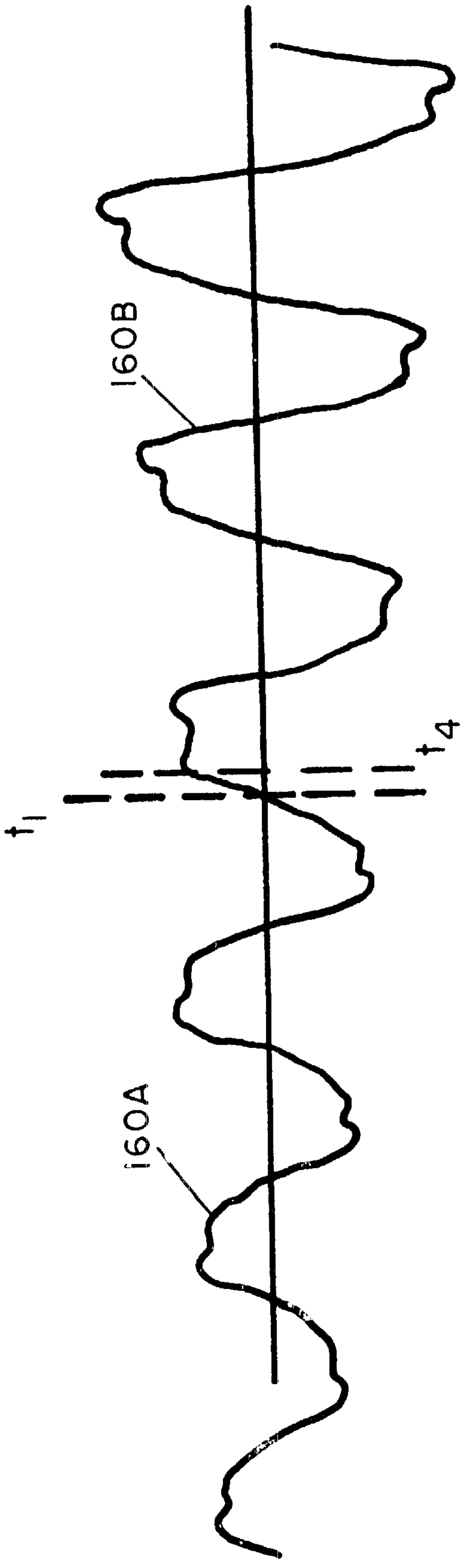
FIG. 5 illustrates a preferred method for joining two parts of waveform together.

Referring to FIG. 5, it has been discovered that if the waveforms are spliced smoothly near their peak, the sounds most pleasing. Thus, at time t1 the system has determined that a midpoint has been reached. Actual splicing may occur at time t4, resulting in a smooth transition from the unreversed waveform 160a to the reverse waveform 160*b*.

Thus it can be seen that in accordance with the simulated reversal of notes in accordance with the present invention, simulation of a realistic Reverse Tape Effect, in real time, by detecting the beginning of a note as in (3), and initially modulating audio signal gain with a rising exponential, while simultaneously recording the note attack and initial portion of the note decay period in digital memory, is achieved. When the input note amplitude envelope has decayed to a predetermined percentage of its peak value, recording stops and playback of the previously stored portion of the note decay and attack dynamic begins, in reverse, with unity signal gain.

Detection of the inflection point amplitude envelope, i.e. the boundary between the note attack and decay portions of the note envelope. This represents the peak amplitude of the note waveform and its detected by software calculation and monitoring for decreasing successive peak signal amplitudes at 16 msec intervals.

Use of the inflection point amplitude to digitally normalize the amplitude envelope of a note by dividing down the peak amplitude, by powers of two, and combining the quotients to create fractional amplitude thresholds. Comparison of the decay portion of the input amplitude envelope against these thresholds gives a measure of the rate fo decay (slope) of the exponential note envelope. As a note decays through each calculated amplitude threshold, microcontroller software modulates the gain of the multiplying D/A converter from an initial value of zero to maximum unity gain, to create a rising exponential gain transfer function. This is accomplished by varying the reference voltage of the multiplying D/A converter through a pulse-width gain modulator.

When a note envelope decays to around 20% of its peak amplitude, the decaying exponential and its inverse (mirror image) intersect. At this point the D/A converter gain has been increased to its maximum value utility gain, and the previously recorded portion of the note decay and attack dynamic are "spliced" into the simulated reverse note effect by playing them back in reverse.

During reverse playback from memory, the microcontroller monitors the A/D converter signal data to detect premature termination of the note decay, by muting the guitar string, or the start of a new note. Otherwise, playback is terminated when the note start address is reached and a pre-start audio interval is played as noted below.

In the simulated mode of operation, only the beginning attack time of each note is stored in memory. The microcontroller monitors the peak note amplitude to detect the end of the attack time and normalize the peak note amplitude at the start of the decay time. During the decay period of a note, the normalized slope of the amplitude envelope is continuously calculated and its inverse used to program the microcontroller's pulse width modulation output. This causes the gain of the multiplying digital analog Converter 60 to increase as rapidly as the note decays, simulating the increasing amplitude of a reversed note envelope. When end of note is detected, the actual attack-time data previously stored in memory is retrieved in reverse and spliced into the audio stream by the microcontroller.

Figure 6:
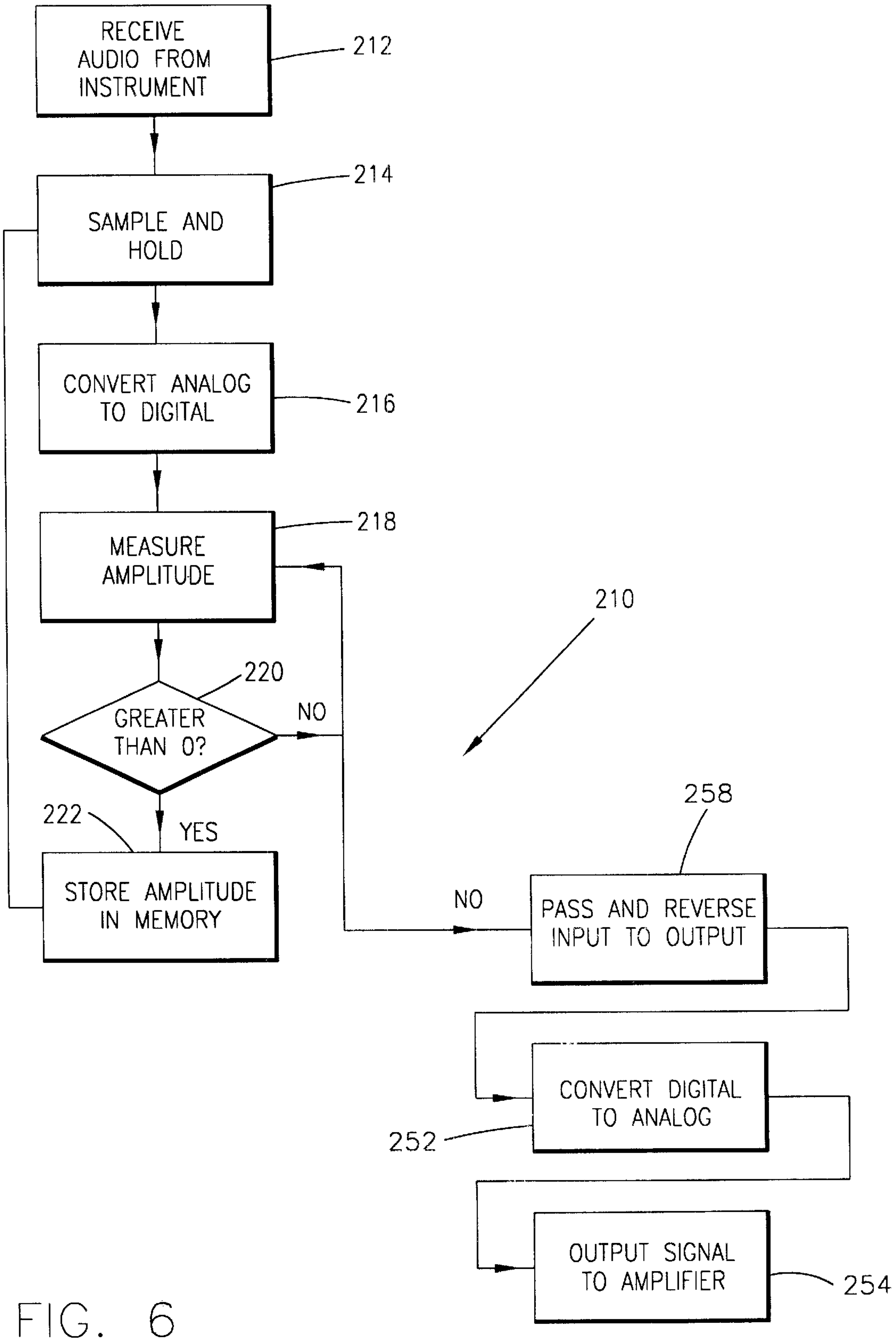
FIG. 6 is a flowchart of the microcontroller software which illustrates the functionality of the inventive digital reverse tape effect system.

Method for Full Reversal Mode:

Referring to FIG. 6, a method of implementing a true reversal of each note from the electrical instrument, with its attendant delay, is illustrated. In accordance with the method 210, the system proceeds at step to 112 to receive the audio input in the form of an electrical signal from an electrical or electronic instrument. After the electrical signal has been received, it is sampled and the value held in accordance with standard digital encoding techniques at step 214. At step 216, the electrical signal value held at step 214 is converted from analog form to digital form.

At step 218, the amplitude of the converted signal is measured, and if it exceeds a certain threshold value, it is determined to be greater than zero. At step 220, if the signal is found to be greater than zero, this would indicate the beginning of a note if prior measurements were not greater than zero. If prior measurements were greater than zero, it would simply indicate that a note is still in progress.

Consider the situation where prior measurements were not greater than zero and the amplitude measured at step 218 is not greater than zero. In this case, the system would proceed at step 220 back to step 218, and the system would continue to monitor amplitude until the beginning of a note is detected proceeding in a loop consisting of checking out each converted analog sample at step 218, until the beginning of a note is detected.

Once the system determines that the sample is of a value greater than zero, at decision step 220, the method proceeds to step 222 where the amplitude of the sample is stored in memory, and the system proceeds back to step 214, until the entire waveform has been stored in memory which would be indicated by the system determining that the signal is not greater than zero at step 220. In this case, the previous readings were greater than zero and this would indicate that the note is ended in the system would proceed to step 258 where the stored in musical load would be played back from memory in reverse order. The system would then changed the digital signal played back from memory in reverse order at step 258 to an analog signal at step 252 and passed the output signal to a conventional audio amplifier at step 254.

Referring back to FIG. 4, the result would be a completely reverse waveform such as waveform 260 illustrated in FIG. 4. This waveform would begin at any time t4 after time t5 at which the system has determined that the note has ended.

Thus it can be seen that in accordance with the true reversal of the present invention, multiple sequential notes are digitized, stored in memory, and played back, with each note reversed but in the original sequence. Playback of a note does not begin until the end of the note is detected and the entire note has been stored in memory. Thus notes are not broken up, recorded and played back in fixed length packets, nor is the filing/emptying of memory based upon specific time periods or determined by predetermined fixed memory address limits. Rather, the duration of the recording and playback notes to/from memory is variable and is determined by the actual length of the notes.

The amount of memory occupied by an individual note varies with the length of the note. Silence intervals between successive notes are encoded during recording and reproduced during playback, but are not stored in memory.

The beginning of a note is detected by the input audio signal exceeding a variable amplitude threshold for a predetermined period of time.

The end of a note is determined by the input audio signal not exceeding a variable amplitude threshold for a predetermined time interval. Such variable threshold is derived proportional to the peak attack amplitude of the note. This prevents softer notes from being terminated prematurely as could occur with a fixed end note threshold.

Addressing of memory used to store digitized notes is controlled by a microcontroller with memory organized in segments, linked in software, to maximize the efficient utilization of memory.

To detect the start of a note without clipping, audio is continuously recorded in one memory segment. When the end of this segment is reached, recording wraps back to the beginning so as to continuously loop through the segment. When the beginning of a note is detected, as noted above, the start address of the note is stored and recording then advances tp reverse playback of the note, when the last memory segment is reached, playback begins at the start address and decrements through the segment, for a fixed time interval, to assure that the entire note attack is played in reverse, including the portion which may have occurred prior to detection of the beginning of the note.

The preferred embodiments of the invention have now been described. However, it should be understood that numerous modifications in, additions to, or omissions from such details are possible within the intended spirit and scope of the invention.

What is claimed is:

1. A method for reversing a series of notes, each of said notes having a waveform, comprising the steps of digitizing a sequence of notes, storing said digitized sequence of notes in memory, and playing back said digitized sequence of notes, said playing back being done with the waveform of each note reversed but with the notes in the original sequence of the series, playback of a reversed note beginning after the end of the note is detected and the entire note has been stored in memory.

2. A method as in claim 1, wherein the time duration of the recording and playback of each of said notes to and from memory is variable and is a function of the actual length of each of said notes.

3. A method as in claim 1, wherein the amount of memory occupied by an individual note varies with the length of the note, and silence intervals between successive notes are encoded during recording and reproduced during playback.

4. A method as in claim 1, wherein the beginning of a note is detected by the input audio signal exceeding a variable amplitude threshold for a predetermined period of time.

5. A method as in claim 1, wherein the end of a note is determined by the input audio signal not exceeding a variable amplitude threshold for a predetermined time interval, said variable threshold being derived proportional to the peak attack amplitude of the note, whereby softer notes are prevented from being terminated prematurely as compared to the operation of a fixed end note threshold.

6. A method as in claim 1, wherein addressing of memory used to store digitized notes is controlled by a microcontroller with memory organized in segments, said segments being linked by software, to maximize the efficient utilization of memory.

7. A method as in claim 4, wherein the start of a note is detected without clipping, and audio is continuously recorded in a first memory segment; when the end of the first memory segment is reached, recording wraps back to the beginning so as to continuously loop through the segment; when the beginning of a note is detected, the start address of the note is stored and recording then advances to the next available segment of memory and through additional segments as required; during reverse playback of the note, when the last memory segment is reached, playback begins at the start address and decrements through the segment, for a fixed time interval, to assure that the entire note attack is played in reverse, including the portion which may have occurred prior to detection of the beginning of the note.

8. A method for simulation of a realistic reverse tape effect, in real time, comprising the steps of detecting the beginning of a note by monitoring the input audio signal to determine when the audio signal exceeds a fixed amplitude threshold for a predetermined period of time and initially modulating audio signal gain with a rising exponential, while simultaneously recording the note attack and initial portion of the note decay period in digital memory, and when the input note amplitude envelope has decayed to a predetermined percentage of its peak value, stopping recording and beginning playback of the previously stored portion of the note decay and attack dynamic in reverse, and with unity gain.

9. A method as in claim 8, wherein the inflection point of the amplitude envelope, i.e. the boundary between the note attack and decay portions of the note envelope is detected to determine the peak amplitude of the note waveform, said detection being done by software calculation and monitoring for decreasing successive peak signal amplitudes at periodic intervals.

10. A method as in claim 8, wherein an inflection point amplitude is used to digitally normalize the amplitude envelope of a note by dividing down the peak amplitude, by powers of two, into quotients and combining the quotients to create fractional amplitude thresholds; the decay portion of the input amplitude envelope is compared against said thresholds to give a measure of the rate of decay or slope of the exponential note envelope.

11. A method as in claim 10, wherein a rising exponential gain transfer function is created as a note decays through each calculated amplitude threshold and microcontroller software modulates the gain of a multiplying digital to analog converter from an initial value of substantially zero to a maximum predetermined gain.

12. A method as in claim 11, wherein a rising exponential gain transfer function is created by varying the reference voltage of the multiplying digital to analog converter through a pulse-width gain modulator.

13. A method as in claim 8, wherein when a note envelope decays to between ten and thirty percent of its peak amplitude, the decaying exponential and its inverse (mirror image) intersect, the D/A converter gain is increased to its maximum value of gain, and the previously recorded portion of the note decay and attack dynamic are “spliced” into the simulated reverse note effect by playing them back in reverse from memory.

14. A method as in claim 8, wherein during reverse playback from memory, the microcontroller monitors the analog to digital converter signal data to detect premature termination of a note decay, or the start of a new note, to terminate playback, said playback being otherwise terminated when the note start address is reached and a pre-start audio interval is played.

* * * * *